United States Patent [19]

Thunig et al.

[11] Patent Number: 4,719,265

[45] Date of Patent: Jan. 12, 1988

[54] PROCESS FOR THE PRODUCTION OF A POURABLE POLYVINYL CHLORIDE WITH HIGH PROPORTIONS OF ACRYLATE ELASTOMERS

[75] Inventors: Dieter Thunig; Rolf-Walter Terwonne, both of Marl, Fed. Rep. of Germany

[73] Assignee: Huels Aktiengesellschaft, Marl, Fed. Rep. of Germany

[21] Appl. No.: 844,440

[22] Filed: Mar. 26, 1986

[30] Foreign Application Priority Data

Mar. 26, 1985 [DE] Fed. Rep. of Germany ....... 3510899

[51] Int. Cl.$^4$ .................. C08L 51/00; C08L 51/04; C08L 27/06; C08L 33/08
[52] U.S. Cl. .................... 525/243; 525/252; 525/260; 525/262; 525/264; 525/308; 526/74; 526/910; 526/911
[58] Field of Search ............... 525/243, 260, 308, 262, 525/264, 252; 526/74, 910

[56] References Cited

U.S. PATENT DOCUMENTS

| | | | |
|---|---|---|---|
| 3,334,156 | 8/1967 | Calentine et al. | 525/308 |
| 3,663,657 | 5/1972 | Sturt | 525/262 |
| 3,969,431 | 7/1976 | Gallagher | 525/308 |
| 3,995,096 | 11/1976 | Flatau et al. | 526/74 |
| 4,011,283 | 3/1977 | Sturt | 525/262 |
| 4,136,242 | 1/1979 | Koyanagi et al. | 526/74 |

Primary Examiner—Carman J. Seccuro
Attorney, Agent, or Firm—Millen & White

[57] ABSTRACT

A pourable polyvinyl chloride having an acrylate content of at least 30 percent by weight, is formed through a process wherein the emulsion polymerization of an acrylic acid ester forming soft polymers is conducted together with a diene crosslinking agent (a) in the presence of a fatty acid soap, or
(b) by the batchwise or continuous addition of the monomer, pre-emulsified with an aqueous alkali lauryl sulfate solution, during polymerization, and by the addition of a fatty acid soap after polymerization, and the vinyl chloride polymerization is performed in the presence of a methylcellulose ether as the suspension agent; wherein, after addition of the suspension agent, a Ca(OH)$_2$ suspension is added, the polymerization charge is neutralized by addition of an acid, and then an organic peroxide is added as the initiator in a dissolved or suspended form. The polymerization can also take place without acid addition, by utilizing azo-type catalysts. The suspension polymerization is not disturbed by wall cakings, and non-tacky, pourable polymers are obtained exhibiting a narrow particle size distribution.

18 Claims, No Drawings

PROCESS FOR THE PRODUCTION OF A POURABLE POLYVINYL CHLORIDE WITH HIGH PROPORTIONS OF ACRYLATE ELASTOMERS

BACKGROUND OF THE INVENTION

The manufacture of polyacrylate-containing polyvinyl chloride is well known. For this purpose, the polymerization of vinyl chloride has been conducted in the presence of the dispersion of the polyacrylic acid ester, thereby obtaining compositions of high impact resistance (cf. German Pat. No. 1,082,734; German Pat. No. 1,090,856). Utilizing this mode of operation, it has proven advantageous to perform the polymerization of the acrylic acid ester, which occurs before the graft polymerization, in the presence of small amounts of a polyunsaturated compound as the crosslinking agent (cf. German Pat. No. 1,090,857). In this way, polyacrylic vinyl chloride polymers can be produced with a polyacrylate content of up to 25% by weight (cf. German Pat. No. 1,082,734).

However, difficulties have been encountered in the polymerization and with the thus formed products if an attempt is made to produce vinyl chloride polymers which have a higher content of polyacrylic acid esters, i.e. concentrates such as are needed for the manufacture of polyvinyl chloride of high impact strength, at any desired point in time, in any desired concentration, and at any desired location.

One problem involves encrustation of deposits on the reactor wall, which increases with a rising proportion of polyacrylic acid ester. This necessitates many frequent, expensive cleaning operations involving mechanical measures or by boiling off by means of a solvent. Additionally, heat removal is interfered with, which can result in an uncontrolled progression of the reaction. The resultant products are not easily filtered and tend to stick together during drying.

These problems, which render the production of vinyl chloride polymers with high polyacrylic acid ester proportions i.e., above 25% by weight, uneconomical, are compounded by the fact that the properties of the final products are unsatisfactory for processing. The resulting particle size distribution is comparatively broad, the product becomes tacky during storage, shows poor pourability, and exhibits a low bulk density.

SUMMARY OF THE INVENTION

It is thus an object of this invention to provide a process for making such high acrylate polyvinyl chloride compositions which ameliorate or eliminates the mentioned disadvantages, inter alia.

Upon further study of the specification and appended claims, further objects and advantages of this invention will become apparent to those skilled in the art.

These objects have been achieved by providing in a process for the production of a pourable polyvinyl chloride having an acrylate content of at least 30 percent by weight, by emulsion polymerization of the acrylic acid ester in the presence of a water-soluble catalyst with the addition of a monomer having at least 2 ethylenically unsaturated, unconjugated bonds, and by the subsequent suspension polymerization of vinyl chloride in the presence of the polyacrylic acid ester dispersion, comprising conducting the emulsion polymerization of the acrylic acid ester, the polymers of which exhibit a glass transition temperature of less than $-15°$ C., (a) in the presence of an alkali metal salt of a fatty acid containing about 12-18 carbon atoms as the emulsifying agent with an initial pH value greater than 9, optionally, in the presence of a buffer; or (b) in the presence of an alkali metal lauryl sulfate emulsifying agent by either batchwise or continuous addition of the monomer, pre-emulsified with an aqueous alkali metal lauryl sulfate solution, during the polymerization, and then after completion of steps (a) or (b), conducting the vinyl chloride polymerization in the presence of a methylcellulose suspension agent, wherein, after addition of the suspension agent a $Ca(OH)_2$ suspension is added, and then either (1) the resultant vinyl chloride polymerization charge is neutralized by the addition of a compatible acid, followed by the addition, in dissolved or suspended form, of an organic peroxide initiator; or, (2) the vinyl chloride polymerization charge has added thereto an azo catalyst in dissolved or suspended form.

This invention also relates to the resultant polymer per se and molded products based thereon, having high impact strength.

DETAILED DISCUSSION

During emulsion polymerization (b) utilizing an alkali metal sulfate emulsifier, the alkali metal lauryl sulfate concentration ranges preferably from about 0.3–0.7 percent by weight, especially about 0.3 percent by weight, based on the amount of the acrylate monomer. Preferably about 0.1 percent of the emulsifier is initially charged and the remaining percentage of the preferred range of the alkali metal lauryl sulfate is linearly or stepwise metered together with the monomer in pre-emulsified form.

After termination of the emulsion polymerization (b), about 0.5–2.0 percent by weight preferably 0.6 to 1.5 wt.%, based on the acrylate, of an alkali metal salt of a fatty acid containing about 12–18 carbon atoms is preferably added so that the formed polyacrylate dispersion remains stable. Suitable alkali metal salts of fatty acids which can be employed in mode of operation (a) or (b) as emulsifiers are sodium laurate, sodium myristate, sodium palmitate, sodium isopalmitate, sodium stearate and the like, or a mixture. Also, the corresponding potassium salts are suitable. Sodium or potassium lauryl sulfate can be utilized as the alkali metal lauryl sulfate.

In the mode of operation (a), the fatty acid salt should be present in concentrations of about 0.85–2.5, preferably 0.9–1.5, percent by weight, based on the acrylate monomer. The pH should be adjusted, e.g., with NaOH or KOH, to an initial value greater than 9, at most, however, up to 11.

During polymerization the pH-value should be maintained at 8-10 by addition of a buffer to obtain a sufficiently stable dispersion.

Suitable buffers include: sodium tetraborate, $K_2HPO_4$, $Na_4P_2O_7$ and $Na_2CO_3$. Buffer concentrations of 0.1 to 2.0 percent by weight, based on the acrylate, are usually employed.

In the mode of operation (b) involving the addition of the pre-emulsified monomers, 40–70 parts by weight of water is mixed with the initiator and, after heating to the polymerization temperature, e.g., 45° to 90° C., the emulsion of the acrylate, comprising from about 90–60 weights parts of water, about 0.2-0.3 parts by weight of alkali lauryl sulfate per 100 parts by weight of acrylate formed by conventional homogenization, is added, either batchwise or continuously, during polymerization. The advantage in this particular mode of operation is that dispersions can be produced having a narrow particle size distribution, e.g., about 90 to 100 wt.% in the range of 0.05-0.25 μm, and a low emulsifier content e.g., about 0.3 to 0.9 wt.%. The typical amount of polymer in the dispersions of (b) is about 25-60 wt.%.

In the mode of operation (a) the whole amount of emulsifier should be charged initially. The monomer is added separately. Particle size and particle size distribution are the same as in mode (b). The typical amounts of polymer in the dispersion are 25-45 wt.%.

Suitable monomeric acrylic acid esters for use in (a) or (b) include those, the homopolymers of which exhibit a glass transition temperature of less than about $-15°$ C., e.g., of $-15°$ C. to $-68°$ C. Suitable embodiments include the $C_3$- to $C_{10}$-acrylates, such as propyl acrylate, butyl acrylate, pentyl acrylate, hexyl acrylate, heptyl acrylate, octyl acrylate, 2-ethylhexyl acrylate, nonyl acrylate, decyl acrylate, phenylpropyl acrylate, phenoxyethoxyethyl acrylate, and the $C_8$- to $C_{12}$-methacrylates, such as octyl methacrylate, nonyl methacrylate, decyl methacrylate, undecyl methacrylate, dodecyl methacrylate and the like, or mixtures.

Suitable monomers containing at least two ethylenically unsaturated bonds are compounds that do not have a conjugated double bond, such as, for example, divinyl esters of di- and tribasic acids, e.g., divinyl adipate, diallyl esters of mono- and polyfunctional acids, such as diallyl phthalate, divinyl ethers of polyhydric alcohols, e.g., divinyl ethers of ethylene glycol, di- and triacrylates of polyhydric alcohols, such as ethylene glycol dimethacrylate, propylene glycol dimethacrylate, etc. These compounds perform a cross-linking function and are used in their normal amounts of 0.3-2.5 wt.%, based on the amount of acrylate monomer.

The crosslinking agent is metered preferentially dissolved in the monomer.

Suitable catalysts utilized in the emulsion polymerization of the acrylic acid ester are the known water-soluble peroxide compounds, such as $H_2O_2$, potassium persulfate, and the like as well as known redox systems, e.g., disclosed in the monograph by Kainer, "Polyvinylchlorid und Vinylchlorid-Mischpolymerisate" [Polyvinyl Chloride and Vinyl Chloride Copolymers], Springer Publishers, 1965, pages 46 et seq., the disclosure of which is incorporated by reference.

Typical reaction times for the emulsion polymerization are 2 to 20 hours.

Preferably, the $Ca(OH)_2$ suspension is added to the vinyl chloride polymerization mixture at a temperature of 50° C. up to the polymerization temperature e.g., about 50° to 70° C., preferably 55° to 65° C. The amount of $Ca(OH)_2$ added, calculated as CaO, ranges from about 0.6 to 1.5 percent by weight, preferably 0.8 to 1.3%, based on the amount of particular polyacrylate utilized. Typically, the concentration of $Ca(OH)_2$ in the added suspension is 2-6 mole%.

The suspension polymerization can be performed in the presence of any of the conventional monomer-soluble catalysts well known to those in the art. Suitable non-limiting embodiments include those from the groups of the diacyl, dialkyl or aroyl peroxides, e.g. diacetyl, dibenzoyl, dilauroyl, 2,4-dichlorobenzoyl peroxide; from the peroxydicarbonates, such as diisopropyl, dicyclohexyl, di-tert-butyl-cyclohexyl, diethylcyclohexyl, dimyristyl, dicetyl, distearyl peroxydicarbonate; from the peresters, such as isopropyl peracetate, tert-butyl peracetate, tert-butyl peroctoate, tert-butyl perpivalate, tert-butyl perneodecanoate, isoamyl perneodecanoate; from the mixed anhydrides of organic sulfolperacids and organic acids, such as, for example, acetylcyclohexylsulfonyl peroxide, and the like, or mixtures.

Methylcellulose compounds suitable for usage include the many known possibilities, e.g., present in the polymerization medium in 0.3 to 1 wt.%, based on the vinyl chloride monomer, preferably in about a 2 wt% aqueous solution having a viscosity of about 40-3,000 mPa·s. Preferably, methylcellulose ethers are used as the suspension stabilizer for the vinyl chloride polymerization, preferably those having a methoxy substitution degree of about 1.6 to 2.0. The viscosity of the methylcellulose in terms of a 2% aqueous solution can range from about 40-3,000 mPa·s, preferably 60-400 mPa·s.

The monomer-soluble catalyst is also fully conventional and is added to the polymerization bath in amounts of 0.02-0.5 wt.% based on vinyl chloride monomer, e.g., in dissolved form, e.g., in aromatic or aliphatic hydrocarbons, such as benzene, toluene, cyclohexane, and the like or, in an aqueous suspension.

Suitable azo catalysts are azobisisobutyronitrile, azobisdimethylvaleronitrile, and many others which are well known to those of skill in the art.

The amount of the catalysts is usually 0.01 to 0.6 percent by weight, preferably 0.04 to 0.5 wt.% based on the amount of vinyl chloride present.

Suitable acids for neutralizing the suspension polymerization charge in the other versions of this invention include, for example, inorganic acids, such as hydrochloric acid, sulfuric acid, phosphoric acid, or organic acids, e.g., formic acid, acetic acid, oxalic acid, citric acid, and most preferably tartaric acid. The acid is used to neutralize the suspension polymerization batch prior to the adding of the peroxide catalysts, e.g., to achieve a pH in the range of 6.5-7.5.

The acids should have preferably a pka-value in the range of $-1$ to $+10$.

The procedure used during suspension polymerization can suitably involve initial charging of the fully demineralized (FD) water and the methylcellulose into the polymerization autoclave, and then adding the polyacrylate dispersion under gentle agitation. The reactor is sealed, purged with $N_2$, and vinyl chloride is introduced under pressure e.g., about 1 to 9 bar. Preferably, the reaction mixture is heated at this point to about 50° C., and CaO is added in the form of an aqueous suspension. Then heating is continued until the polymerization temperature has been reached. At this point, an amount of acid sufficient for neutralization is added in one version. After stirring, generally for about 10 minutes, the catalyst is added in dissolved or suspended form. It is also possible to introduce the $Ca(OH)_2$ and the acid at room temperature and to heat to the polymerization temperature only after the addition of the catalyst.

According to the process of this invention, amounts of polyacrylate dispersion can be so incorporated into the polymerization of vinyl chloride so that the final product contains about 30-70% by weight, preferably 30-60% by weight, of polyacrylate.

The amount of polyacrylate in the dispersion may be 8 to 35 percent.

When an azo catalyst is employed, the Ca(OH)$_2$ can likewise be added either at room temperature or elevated temperature, e.g., about 50° C. up to the polymerization temperature. After adding the azo catalyst, heating is then performed to the polymerization temperature, if necessary.

The reaction time for the vinylchloride polymerization is typically in the range of 5 to 15 hours.

Except for the aspects described otherwise above, all aspects of the polymerizations of this invention are conventional and disclosed, e.g., in Encyclopedia of PVC (1976), Ed. L. I. Nass, Marcel Dekker Inc., and in Developments in PVC-Production and Processing (1977), Ed. A. Whelan and I. L. Craft, Applied Science Publishers, which disclosure is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

COMPARATIVE EXAMPLE 1

Preparation of Polybutyl Acrylate Dispersion
Reactor: 150-liter metal autoclave

| Amounts of Feed: | Parts | kg |
|---|---|---|
| Receiver: | | |
| FD Water | 196.62 | 49.155 |
| Lauric acid | 0.450 | 0.1126 |
| 1 N Sodium hydroxide solution | 3.380 | 0.8450 |
| Ammonium persulfate | 0.030 | 0.0075 |
| Disodium tetraborate | 3.800 | 0.950 |
| Metered Feed: | | |
| I. Butyl acrylate | 99.0 | 24.750 |
| Diallyl phthalate | 1.0 | 0.250 |
| II. FD Water | 100.00 | 25.00 |
| Ammonium sulfate | 0.060 | 0.015 |
| Disodium tetraborate | 1.900 | 0.475 |

Fully demineralized water, disodium tetraborate, and the predissolved lauric acid, sodium hydroxide solution are charged under agitation (n=100 min$^{-1}$) into the reactor equipped with a blade agitator.

After purging with nitrogen and evacuating three times, a pressure of about 1 bar is left on the reactor. The reaction mixture is heated to the polymerization temperature (80° C.). the initiator is added and, after 10 minutes, 1.0% of the monomer mixture is introduced. After startup of polymerization, the monomer mixture and the initiator/borate solution are added uniformly in metered quantities within 4 hours. After the end of the dosing step, the mixture is stirred for another 4 hours at 80° C.; subsequently the mixture is cooled and discharged.

Suspension Polymerization
Reactor: 235-liter metal autoclave, impeller agitator, baffle

| Feed Materials: | Parts | kg |
|---|---|---|
| FD Water | 162.5 | 79.6 |
| Polyacrylate dispersion | 178.0 | 87.2 |

-continued

Suspension Polymerization
Reactor: 235-liter metal autoclave, impeller agitator, baffle

| Feed Materials: | Parts | kg |
|---|---|---|
| Vinyl chloride | 55.5 | 27.8 |
| Methylhydroxypropyl-cellulose (viscosity of 2% aqueous solution 50 mPa.s) | 1.0 | 0.49 |
| Lauroyl peroxide | 0.086 | 0.042 |

Fully demineralized water, suspension agent solution and initiator are charged into the reactor at room temperature, and the polyacrylate dispersion is added under slow agitation. The reactor is sealed, purged three times with nitrogen and evacuated. Then vinyl chloride is added, thereafter the speed is adjusted (270–330 min$^{-1}$). The reactor jacket is heated to 60° C. and maintained at this temperature up to a vinyl chloride residual pressure of 3 bar. The reactor is cooled. The suspension is discharged, the solid matter is removed by filtration and dried on metal sheets at 50° C. under vacuum.

EXAMPLE 1 (ACCORDING TO THE INVENTION)

Reactor: 235-liter metal autoclave, impeller agitator, baffle

| Feed Materials: | Parts | kg |
|---|---|---|
| FD Water | 162.5 | 79.6 |
| Polyacrylate dispersion (prepared according to Comparative Example 1) | 178.0 | 87.2 |
| Vinyl chloride | 55.5 | 27.8 |
| Methylcellulose | 1.0 | 0.49 |
| Calcium oxide (as Ca(OH)$_2$) | 0.5 | 0.245 |
| Tartaric acid | 1.37 | 0.67 |
| Lauroyl peroxide dissolved in | 0.086 | 0.042 |
| Toluene | 0.31 | 0.15 |

FD Water (fully demineralized water) and solution of suspension agent (methylcellulose with a degree of substitution of 1.8, the viscosity of the 2% by weight aqueous solution amounting to 60 mPa's) are charged into the reactor at room temperature, and the polyacrylate dispersion is added under slow agitation. The reactor is sealed, purged three times with nitrogen and evacuated. Then vinyl chloride is introduced, after which the speed is adjusted (270–330 min$^{-1}$).

The reactor jacket is heated up. At 50° C., calcium oxide is introduced in the form of an aqueous suspension. After reaching the polymerization temperature (60° C.), the tartaric acid (dissolved in 5 l of FD water) is added thereto. Ten minutes after this step, the initiator is introduced in the form of a toluene solution. Upon reaching a vinyl chloride residual pressure of 3.0 bar, the reaction mixture is cooled, discharged, filtered, and the solid product is dried on metal sheets at 50° C. under vacuum.

| | Result of Polymerization | | | |
|---|---|---|---|---|
| | Bulk Density | Particle Size Distribution (%) | | Re- |
| | (g/l) | >63 μm | >100 μm | >400 μm | marks |
| Example 1 | 450 | 100 | 90 | 3 | Pour- |

| | Result of Polymerization | | | |
|---|---|---|---|---|
| | Bulk Density | Particle Size Distribution (%) | | Re- marks |
| | (g/l) | >63 μm  >100 μm  >400 μm | | |
| (Acc. to Invention) | | | | able |
| Comp. Ex. 1 (Not Acc. to Invention) | 290 | No screening analysis possible since product tacky | | |

The unexpected effects of the mode of operation according to this invention reside, on the one hand, in that the final product, in spite of the exceedingly high content of polyacrylate elastomers of ≈50% by weight, is not tacky but pourable, and exhibits a desirably narrow particle size distribution and a good bulk density. On the other hand, the unexpected advantage manifests itself in that the reactor wall remains free of wall encrustations during the polymerization.

EXAMPLE 2 (ACCORDING TO THE INVENTION)

Preparation of Polybutyl Acrylate Dispersion
Pursuant to Mode of Operation (b)
Reactor: 150-liter metal autoclave
Metered Feed: Stirrable receiver

| Amounts of Feed: | Parts | kg |
|---|---|---|
| Receiver: | | |
| FD Water (fully demineralized water) | 57.5 | 29.59 |
| Lauryl sulfate | 0.09 | 0.0463 |
| Ammonium persulfate | 0.02 | 0.0103 |
| Metered Feed: | | |
| FD Water | 65.0 | 33.45 |
| Lauryl sulfate | 0.19 | 0.0978 |
| Ammonium persulfate | 0.055 | 0.0283 |
| Sodium carbonate (anhydrous) | 0.50 | 0.2573 |
| Butyl acrylate | 99.0 | 50.94 |
| Diallyl phthalate | 1.0 | 0.5146 |
| Subsequent Addition: | | |
| FD Water | 5.0 | 2.57 |
| Lauric acid | 0.766 | 0.3942 |
| 1 N NaOH | 5.7 | 2.93 |

The reactor, equipped with blade agitator, is charged with FD water and lauryl sulfate under agitation. After purging three times with nitrogen and evacuating, a pressure of about 1 bar is left on the reactor. The reaction mixture is heated to polymerization temperature (80° C.). At 80° C., the initiator is added; 10 minutes after this step, metered feeding is begun.

The components of the metered feed are homogenized in a stirrable receiver (30 minutes) (while passing $N_2$ over the mixture) and are dosed uniformly within 4 hours.

Thereafter, the mixture is further stirred for one hour at 80° C.; then the sodium laurate solution (additive) is introduced, likewise by way of the receiver. After additional agitation at 80° C. (one hour), the mixture is cooled and discharged.

The resultant polybutyl acrylate dispersion has a solids content of about 42.9% by weight.

SUSPENSION POLYMERIZATION, EXAMPLE 2

Changes as compared with Example 1: different solids content of dispersions utilized.

| Feed Materials: | Parts | kg |
|---|---|---|
| FD Water | 236.7 | 116.0 |
| Polyacrylate dispersion | 103.7 | 50.8 |

Otherwise, the procedure was the same as in Example 1. Analogously to the outcome of Example 1, a pourable product was obtained. The reactor wall remained free of deposits.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a pourable polyvinyl chloride having an acrylate polymer content of at least 30 percent by weight, comprising emulsion polymerizing an acrylic acid ester or ether, having at least two ethylenically unsaturated, unconjugated double bonds, in the presence of a water-soluble catalyst and an unconjugated diene monomer to produce a polyacrylic acid ester emulsion, and then subsequently suspension polymerizing vinyl chloride in the presence of said polyacrylic acid ester emulsion, wherein the acrylic acid ester in the emulsion polymerization is one whose homopolymer has a glass transition temperature of less than −15° C., wherein the emulsion polymerization is conducted (a) in the presence of an alkali metal salt of a fatty acid of about 12–18 carbon atoms as the emulsifying agent with an initial pH greater than 9, or (b) in the presence of an alkali metal lauryl sulfate emulsifying agent, wherein the process is conducted by batchwise or continuous addition during the polymerization, of the acrylate monomer pre-emulsified in an aqueous alkali metal lauryl sulfate solution, and wherein after completion of the emulsion polymerization, the vinyl chloride polymerization is conducted in the presence of a methylcellulose suspension agent having a viscosity in a 2% aqueous solution of 40 to 3,000 mPa's and a degree of methoxy substitution of about 1.6 to 2.0, and after addition of the suspension agent, a $Ca(OH)_2$ suspension is added thereto and then (1) the vinyl chloride polymerization charge is neutralized by the addition of a compatible acid, followed by the addition, in dissolved or suspended form, of an organic peroxide initiator; or, (2) and azo catalyst is added to the vinyl chloride polymerization charge an in dissolved or suspended form.

2. A process of claim 1, conducted according to mode (a) and wherein an organic peroxide initiator is used in the vinyl chloride polymerization.

3. A process of claim 1, conducted according to mode (a) and wherein an azo catalyst is used in the vinyl polymerization.

4. A process of claim 1, conducted according to mode (b) and wherein an organic peroxide initiator is used in the vinyl chloride polymerization.

5. A process of claim 1, conducted according to mode (b) and wherein an azo catalyst is used in the vinyl polymerization.

6. A process according to claim 1 wherein the Ca(OH)$_2$ suspension is added at a temperature of about 50° C. up to the polymerization temperature.

7. A process according to claim 1 wherein the amount of Ca(OH)$_2$ added is 0.6-1.5 percent by weight (calculated as CaO), based on the amount of polyacrylate employed.

8. A process according to claim 1 wherein the suspension polymerization batch is neutralized with tartaric acid prior to adding an organic peroxide initiator.

9. A process according to claim 1 wherein during emulsion polymerization according to mode of operation (b), the alkali metal lauryl sulfate concentration is 0.3-0.7 percent by weight, based on the acrylate monomer.

10. A process according to claim 1 wherein after the emulsion polymerization according to mode of operation (b), an alkali metal salt of a fatty acid of 12-18 carbon atoms is added to the resultant emulsion.

11. A process according to claim 1 wherein during emulsion polymerization according to mode of operation (b), the alkali metal lauryl sulfate concentration is about 0.3 wt.%, based on the acrylate monomer.

12. A process according to claim 10 wherein the alkali metal salt is of sodium or potassium.

13. A process according to claim 1 wherein during emulsion polymerization according to mode of operation (a), an effective amount of a compatible buffer is present.

14. A process according to claim 1 wherein during emulsion polymerization according to mode of operation (b), the emulsion of the acrylate comprises about 90-60 wt. parts of alkali metal lauryl sulfate per 100 wt. parts of acrylate.

15. A process according to claim 1 wherein the azo catalyst is present in about 0.01 to 0.6 wt.%, based on the amount of vinyl chloride present.

16. A process according to claim 1 wherein the azo catalyst is azobisisobutyronitrile or azobisdimethylvaleronitrile.

17. A process according to claim 1 wherein the resulting polyvinyl chloride-acrylate polymer contains 30-70 wt.% of polyacrylate.

18. A high impact strength pourable polyvinyl chloride having a polyacrylate content of 30-70 wt.% and prepared by the process of claim 1.

* * * * *